United States Patent Office 3,215,699
Patented Nov. 2, 1965

3,215,699
SUBSTITUTED ACETYLPHENYL HYDRAZONES
OF 2,3-PIPERIDINE DIONES
John Shavel, Jr., Mendham, Maximilian von Strandtmann, Rockaway Township, and Marvin P. Cohen, New Milford N.J., assignors to Warner-Lambert Pharmaceutical Company, Morris Plains, N.J., a corporation of Delaware
No Drawing. Original application June 27, 1961, Ser. No. 119,831, now Patent No. 3,182,071, dated May 4, 1965. Divided and this application Sept. 28, 1964, Ser. No. 399,832
7 Claims. (Cl. 260—294.7)

The present application is a divisional application of copending U.S. patent application Serial No. 119,831, filed June 27, 1961, now U.S. Patent No. 3,182,071.

The resent invention relates to new and novel acylated indole derivatives having the formula:

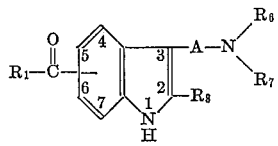

wherein the

substituent may be at the 4,5,6 or 7 position and wherein $R_1$ is lower alkyl such as methyl, ethyl, isopropyl, isobutyl, n-butyl and the like, cycloalkyl such as cyclopentyl, cyclohexyl and cycloheptyl, a 5 or 6 membered heterocyclic aromatic radical containing sulfur, oxygen, or one to two nitrogen atoms in the ring such as radicals derived from pyrimidine, furan, pyrrole, thiophene, pyran, pyridine, and thiopyran, naphthyl, and radicals of the formula

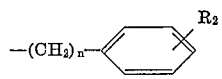

in which $n$ is 0 to 3 and $R_2$ which may be in the ortho, meta or para-position is phenyl, halogen, lower alkyl, trifluoromethyl, lower alkoxy, hydrogen, di-(lower alkyl)amino, cycloalkyl, nitro, benzoyl and the acyl radical of an aliphatic carboxylic acid containing 2 to 6 carbon atoms; A is a radical of the formula

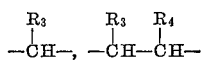

and

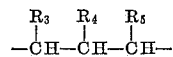

in which $R_3$, $R_4$ and $R_5$ are hydrogen, lower alkyl, or

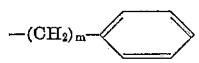

in which $m$ is 0 to 3; $R_6$ and $R_7$ are hydrogen, lower alkyl, cycloalkyl, lower alkyl substituted with a hydroxy. amino or lower alkoxy group, radicals of the formula

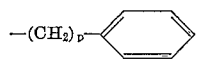

in which $p$ is 0 to 3, and when taken with the amino nitrogen atom form a piperidino, pyrrolidino or morpholino group, and when $R_6$ is hydrogen, $R_7$ may be benzoyl or the acyl radical of an aliphatic carboxylic acid containing 2 to 6 carbon atoms; and $R_8$ is hydrogen, carboxy or carbo-lower alkoxy. This invention also relates to the pharmaceutically acceptable nontoxic acid addition and quaternary ammonium salts of the above compounds, to a method of preparing them and to new and novel intermediates obtained in the course of the synthesis.

As used throughout the specification and in the claims, the following terms have the following meanings: "lower alkyl" and "lower alkoxy" refer to straight and branched chain aliphatic groups containing 1 to 6 carbon atoms; "cycloalkyl" refers to cyclic aliphatic groups containing 5 to 7 carbon atoms; and "halogen" refers to chlorine, bromine or fluorine.

The compounds of our invention are indole derivatives bearing a side chain at the 3-position containing an amino nitrogen atom and an acyl group at the 4, 5, 6 or 7 position. The substitution of an acyl group on the benzene ring of the indole structure to form compounds of the above formula has not heretofore been known and is an important feature of our invention.

The new and novel compound of our invention are valuable intermediates useful in the preparation of other indole derivatives. For example, the presence of an

substituent renders our compounds susceptible to the various reactions of ketones involving a carbonyl group. In addition, our compounds have been found to possess interesting and significant pharmacological activity. They have a pronounced lowering effect upon blood pressure, with an ability to increase coronary flow, and also exhibit anti-serotonin activity and depress the central nervous system. Those compounds of our invention having the formula

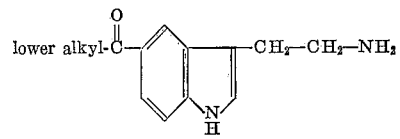

are unusually effective hypotensive agents which promote an increase in coronary flow and also exhibit anti-serotonin activity.

It has now been found that those compounds of our invention having the formula

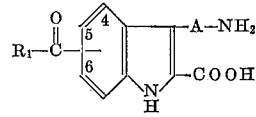

wherein $R_1$ and A are as described hereinabove and where the

substituent is at the 4, 5 or 6 position may be prepared by the following sequence:

First, a diazonium compound having the formula:

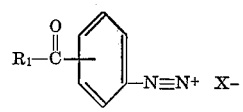

wherein the

substituent is meta or para to the nitrogen atom and X is halogen or hydroxyl is reacted with a substituted cyclic nitrogen-containing acid of the formula:

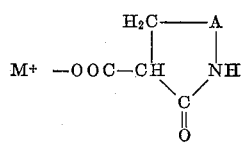

wherein M is hydrogen or an alkali metal to form a hydrazone of the formula:

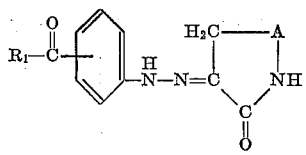

the

substituent being meta or para to the nitrogen containing substituent.

This reaction is normally carried out at a temperature between about 0° C. and about 15° C. and at an acidic pH, preferably about 3 to 4. The precipitated hydrazone is recovered and purified by crystallization.

Then, the hydrazone prepared as described above is converted to a heterocyclic substituted indole of the formula:

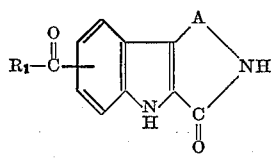

by heating with formic acid or a mineral acid, such as hydrochloric acid. Refluxing the above heterocyclic substituted indole derivative in the presence of aqueous alcoholic alkali, for example, potassium or sodium hydroxide in aqueous ethanol, followed by acidification yields the desired compounds of the formula

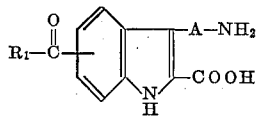

wherein the

substituent is at the 4, 5 or 6 position.

Those compounds of our invention of the formula:

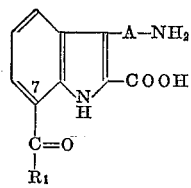

may be prepared by a modification of the foregoing procedure wherein the carbonyl group of the

substituent is protected as a

group during the sequence. The

group may be regenerated to an

either at the end of the sequence or at the heterocyclic substituted indole stage by an oxidation procedure, such as the well-known Oppenauer oxidation, which involves treatment under reflux with an aluminum alkoxide, such as aluminum phenoxide, aluminum isopropoxide, aluminum t-butoxide and the like and a ketone such as cyclohexanone or acetone in an inert organic solvent such as benzene, toluene and the like.

In addition, those compounds of our invention having the formula:

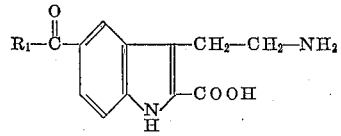

may alternately be prepared by treating the known compound 1,2,3,4-tetrahydro-1-oxo-β-carboline, described in German Patent 1,082,598, with an acyl halide of the formula

where X is halogen, or an acid anhydride of the formula

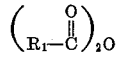

in the presence of a Friedel-Crafts catalyst to form a 6-acyl-1,2,3,4-tetrahydro-1-oxo-β-carboline of the formula:

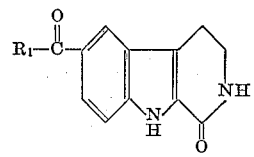

which may be hydrolyzed as described above to form a 5-acyl-2-carboxytryptamine. The acylation of 1,2,3,4-tetrahydro-1-oxo-β-carboline is described and claimed in copending application of John Shavel, Jr., entitled "Method of Preparing 6-Acylated Derivatives of 1,2,3,4-Tetrahydro-1-Oxo-β-Carboline," Serial No. 119,828, filed June 27, 1964, now abandoned.

Refluxing the acylated 2-carboxy substituted indole derivatives of the formula:

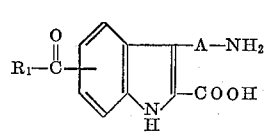

in which the

substituent is at the 4, 5, 6, or 7 position in an acid medium, for example, a mixture of acetic and hydrochloric acids, followed by basification, results in decarboxylation to form those compounds of our invention having the formula:

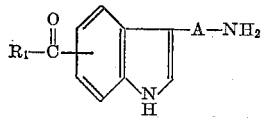

which compounds may in turn be N-acylated by conventional procedures to form compounds of the formula:

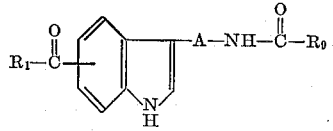

in which $R_9$ is phenyl or lower alkyl.

When 2-carboxy substituted indole derivatives of the formula:

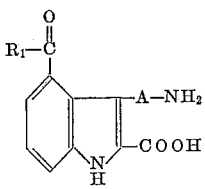

are decarboxylated as described above, it is observed that a cyclic intermediate having the formula:

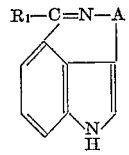

may be isolated from the reaction mixture. These cyclo-anhydro compounds have been observed to be the more stable forms of the 4-acylated indole derivatives of our invention having the formula:

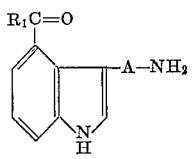

The acylated 2-carboxy substituted indole derivatives of our invention may be treated with formaldehyde in the presence of palladium on charcoal or with a mixture of formaldehyde and formic acid to form compounds of the formula:

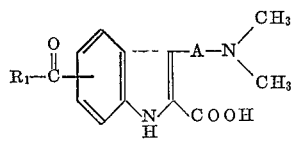

which may then be decarboxylated as described above to form compounds of the formula:

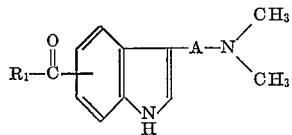

Those compounds of our invention having the formula:

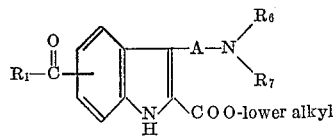

are prepared by the following sequence, as described and claimed in copending application of John Shavel, Jr., and Maximilian von Strandtmann entitled "Method of Preparing Substituted Indole Derivatives," Serial No. 119,830, filed June 27, 1961.

First, a keto ester of the formula:

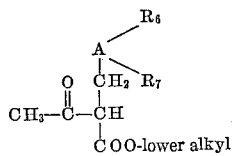

is coupled with a diazonium compound of the formula:

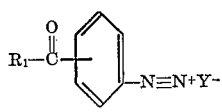

wherein Y is halogen or hydroxyl to form a hydrazone of the formula:

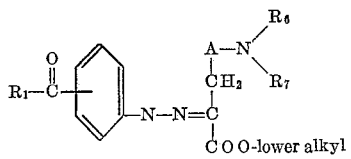

Then, the above hydrazone is heated with formic acid or a mineral acid to yield those compounds of our invention having the formula:

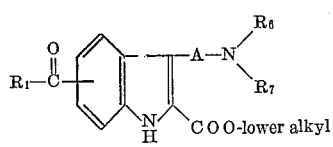

It has been found that these compounds may be hydrolyzed and decarboxylated by treatment with an acid under reflux to yield compounds of the formula:

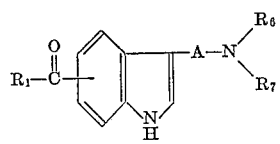

The compounds of our invention may be converted into their pharmaceutically acceptable non-toxic acid addition and quaternary ammonium salts by conventional procedures. Exemplary of non-toxic acid addition salts are those formed with maleic, fumaric, succinic, tartaric, citric, malic, cinnamic, sulfonic, hydrochloric, hydrobromic, sulfuric, phosphoric, and nitric acids. The acid addition salts may be prepared in the conventional manner, by treating a solution or suspension of the free base in an organic solvent with the desired acid, and then recovering the salt which forms by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate, or methyl p-toluene sulfonate.

For therapeutic use, our compounds, either as the free base or in the form of salts, may be combined with conventional pharmaceutical diluents and carriers to form such dosage units as tablets, capsules, suppositories, elixirs, solutions or suspensions.

The following examples are included in order further to illustrate the present invention:

EXAMPLE 1

*2,3-piperidinedione-3-(p-acetylphenyl)hydrazone*

To 800 ml. of 0.5-N potassium hydroxide are added 68 g. 3-carbethoxy-2-piperidone and the mixture is kept at 30° for eighteen hours. The solution is filtered, cooled to 0°, and acidified with 40 ml. of 6-N hydrochloric acid. This is added with stirring at 0° to a fresh solution of p-acetylphenyl-diazonium chloride, prepared from 54 g. p-aminoacetophenone in 725 ml. 2.7-N hydrochloric acid and 29 g. sodium nitrite in 100 ml. water. The solution is adjusted to about pH 3.5 by the addition of a solution of 140 g. anhydrous sodium acetate in 150 ml. water and stirred for 5 hours. The precipitated yellow-orange product is filtered off and recrystallized from 95% ethanol. Yield: 80 g. (82% of theory) of 2,3-piperidinedione-3-(p-acetylphenyl)hydrazone, M.P. 229–31°.

*Analysis.*—Calcd: C, 63.66; H, 6.16; N, 17.13. Found: C, 63.40; H, 6.28; N, 16.93.

EXAMPLE 2

*6-methyl-2,3-piperidinedione-3-(p-acetylphenyl)-hydrazone*

To one liter of 0.5-N potassium hydroxide are added 92.5 g. 6-methyl-3-carbethoxy-2-piperidone (prepared by the hydrogenation over 10% palladium on charcoal of ethyl α-carbethoxy-δ-keto-caproate in absolute ethanol saturated with ammonia). The mixture is kept at 30° for eighteen hours. The solution is filtered, cooled to 0°, and acidified with 50 ml. of 6-N-hydrochloric acid. This is added with stirring at 0° to a fresh solution of p-acetylphenyldiazonium chloride (prepared from 67.5 g. p-aminoacetophenone in 957 ml. 2.7-N hydrochloric acid and 36.25 g. sodium nitrite in 125 ml. water). The solution is adjusted to about pH 3.5 by the addition of a solution of 125 g. anhydrous sodium acetate in 250 ml. water. The mixture is stirred for five hours at 0–10°, and the precipitated orange product filtered off, and recrystallized from 70% aqueous ethanol. Yield: 78 g. (60% of theory) M.P. 239–40°. Threefold recrystallization yields pure 6-methyl-2,3-piperidinedione-3-(p-acetylphenyl)hydrazone, M.P. 250–51°.

*Analysis.*—Calcd: C, 64.84; H, 6.61; N, 16.21. Found: C, 64.68; H, 6.77; N, 16.03.

EXAMPLE 3

*5-methyl-2,3-piperidinedione-3-(p-acetylphenyl) hydrazone*

To 200 ml. of 0.5-N potassium hydroxide are added 18.5 g. 3-carbethoxy-5-methyl-2-piperidone and the mixture is kept at room temperature for 18 hours. The solution is filtered, cooled to 0°, and acidified with 10 ml. of 6-N hydrochloric acid. This is added with stirring at 0° to a fresh solution of p-acetylphenyldiazonium chloride (prepared from 13.5 g. p-aminoacetophenone in 191.25 ml. 2.7-N hydrochloric acid and 7.25 g. sodium nitrite in 25 ml. water). The solution is adjusted to about pH 3.5 by the addition of a solution of 25 g. anhydrous sodium acetate in 50 ml. water and stirred for five hours at 0–10°. The precipitated orange product is filtered off and recrystallized from absolute ethanol. Yield: 10 g. (38% of theory) M.P. 226–44°. Twofold recrystallization from 70% aqueous ethanol gives pure 5-methyl-2,3-piperidinedione-3-(p-acetylphenyl)hydrazone, M.P. 243–44°.

*Analysis.*—Calcd: C, 64.84; H, 6.61; N, 16.21. Found: C, 64.75; H, 6.73; N, 16.29.

EXAMPLE 4

*2,3-piperidinedione-3-(p-propionylphenyl)-hydrazone*

To 200 ml. of 0.5-N potassium hydroxide is added 17 g. 3-carbethoxy-2-piperidone and the mixture is kept at 30° for 18 hours. The solution is filtered, cooled to 0°, and acidified with 10 ml. of 6-N hydrochloric acid. This is added with stirring at 0° to a fresh solution of p-propionylphenyl-diazonium chloride (prepared from 14.9 g. p-aminopropiophenone in 191.25 ml. 2.7-N hydrochloric acid and 7.25 g. sodium nitrite in 25 ml. $H_2O$). The solution is adjusted to about pH 3.5 by the addition of a solution of 25 g. of anhydrous sodium acetate in 50 ml. water and stirring for 5 hours at 0–10°. The precipitated yellow orange product is filtered off and recrystallized from methanol to yield 15 g. (58% of theory) of pure 2,3-piperidinedione-3-(p-propionylphenyl)hydrazone, M.P. 216–219°.

*Analysis.*—Calcd: C, 64.84; H, 6.61; N, 16.21. Found: C, 64.55; H, 6.72; N, 16.19.

EXAMPLE 5

*5-methyl-2,3-piperidinedione-3-(p-propionylphenyl)-hydrazone*

To 200 ml. of 0.5-N potassium hydroxide are added 18.5 g. 5-methyl-3-carbethoxy-2-piperidone and the mixture is kept at room temperature for 18 hours. The solution is filtered, cooled to 0°, and acidified with 10 ml. of 6-N hydrochloric acid. This was added with stirring at 0° to a fresh solution of p-propionylphenyldiazonium chloride, prepared from 14.9 g. p-aminopropiophenone in 191.5 ml. 2.7-N hydrochloric acid and 7.25 g. sodium nitrite in 25 ml. water. The solution is adjusted to about pH 3.5 by the addition of a solution of 25 g. anhydrous sodium acetate in 50 ml. water and stirred for 5 hours at 0–10°. The precipitated yellow-orange product is filtered off, and recrystallized from 50% aqueous ethanol. Yield: 13 g. (47% of theory) of pure 5-methyl-2,3-piperidinedione-3-(p-propionylphenyl)hydrazone, M.P. 238–40°.

*Analysis.*—Calcd: C, 65.91; H, 7.00; N, 15.38. Found: C, 65.93; H, 7.16; N, 15.25.

EXAMPLE 6

*2,3-piperidinedione-3-(p-benzoylphenyl)hydrazone*

To 400 ml. of 0.5-N potassium hydroxide are added 34 g. 3-carbethoxy-2-piperidone and the mixture is kept at 30° for 20 hours. The solution is filtered, cooled to 0°, and acidified with 20 ml. of 6-N-hydrochloric acid. This is added with stirring at 0° to a fresh solution of p-benzoylphenyldiazonium chloride (prepared from 34.6 g. p-amino-benzophenone in 382 ml. 2.6-N hydrochloric acid and 14.5 g. sodium nitrite in 50 ml. water at 0°). After stirring for 15 minutes, the solution is adjusted to about pH 3.5 by the addition of a solution of 35 g. sodium acetate in 75 ml. water. The solution is stirred for 5 hours at 0–10°. The precipitated yellow orange product is collected by filtration, dried in vacuo over $P_2O_5$ at room temperature, and recrystallized from ethanol. Yield: 22 g. (55% of theory) M.P. 204–206°. Recrystallization from ethanol yields pure 2,3-piperidinedione-3-(p-benzoylphenyl)hydrazone, M.P. 206–208°.

*Analysis.*—Calcd: C, 70.34; H, 5.58; N, 13.67. Found: C, 70.06; H, 5.88; N, 13.50.

EXAMPLE 7

*5-methyl-2,3-piperidinedione-3-(p-benzoylphenyl)hydrazone*

The interaction of 3-carbethoxy-5-methyl-2-piperidone with p-benzoylphenyldiazonium chloride by the procedure described in Example 3 yields (at 70% of theory) 5-methyl-2,3-piperidinedione-3-(p-benzoylphenyl)hydrazone, M.P. 174–186°. Twofold recrystallization from 70% aqueous ethanol yields the pure product, M.P. 197–202°.

*Analysis.*—Calcd: C, 71.01; H, 5.96; N, 13.08. Found: C, 70.97; H, 6.19; N, 13.24.

EXAMPLE 8

*2,3-piperidinedione-3-(m-acetylphenyl)hydrazone*

To 200 ml. of 0.5-N potassium hydroxide is added 17 g. 3-carbethoxy-2-piperidone and the mixture is kept at 30° for 18 hours. The solution is filtered, cooled to 0°, and acidified with 10 ml. of 6-N hydrochloric acid. This is added with stirring at 0° to a fresh solution of m-acetylphenyldiazonium chloride (prepared from 13.5 g. m-aminoacetophenone in 191.25 ml. 2.7-N hydrochloric acid and 7.25 g. sodium nitrite in 25 ml. water). The solution is adjusted to about pH 3.5 by the addition of a solution of 25 g. anhydrous sodium acetate in 50 ml. of water and stirred at 0–10° for 5 hours. The precipitated light brown material is filtered off, and recrystallized from 95% ethanol. Yield: 10 g. (41% of theory), M.P. 174–80°. Recrystallization from 95% ethanol yields pure 2,3-piperidinedione-3-(m-acetylphenyl)hydrazone as a hemihydrate, M.P., shrinks at 160–65°, melts 204–06°.

*Analysis.*—Calcd: C, 61.40; H, 6.34; N, 16.53. Found: C, 61.58; H, 6.59; N, 16.87.

EXAMPLE 9

*5-methyl-2,3-piperidinedione-3-(m-acetylphenyl)hydrazone*

Interaction of 3-carbethoxy-5-methyl-2-piperidone and m-acetylphenyldiazonium chloride by the procedure described in Example 8 yields, after twofold recrystallization from 70% aqueous ethanol, 5-methyl-2,3-piperidinedione-3-(m-acetylphenyl)hydrazone, M.P. 215–216°.

*Analysis.*—Calcd: C, 64.84; H, 6.61; N, 16.21. Found: C, 64.64; H, 6.59; N, 15.99.

In the foregoing examples, all temperatures are given in degrees centigrade.

It is understood that the foregoing detailed description is given merely by way of illustration and that many variations may be made therein without departing from the spirit of our invention.

What is claimed is:

1. 2,3 - piperidinedione - 3 - (p - acetylphenyl)hydrazone.
2. 6-methyl - 2,3 - piperidinedione - 3 - (p - acetylphenyl)hydrazone.
3. 2,3 - piperidinedione - 3 - (p - propionylphenyl)hydrazone.
4. 2,3 - piperidinedione - 3 - (p - benzoylphenyl)hydrazone.
5. 2,3 - piperidinedione - 3 - (m - acetylphenyl)hydrazone.
6. 5 - methyl - 2,3 - piperidinedione - 3 - (m - acetylphenyl)hydrazone.
7. A compound of the formula:

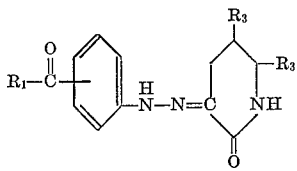

wherein the

substituent is a member selected from the group consisting of:
(A) meta and para alkanoyl of 2 to 3 carbon atoms and
(B) meta and para benzoyl; and $R_3$ and $R_4$ are members selected from the group consisting of hydrogen and methyl.

References Cited by the Examiner

Abramovitch et al.: "Chemistry and Industry," page 1255, July–September (1955).

NICHOLAS S. RIZZO, *Primary Examiner.*